US011499092B2

(12) United States Patent
Almohsin et al.

(10) Patent No.: US 11,499,092 B2
(45) Date of Patent: Nov. 15, 2022

(54) COATED NANOSAND AS RELATIVE PERMEABILITY MODIFIER

(71) Applicant: Saudi Arabian Oil Company, Dhahran (SA)

(72) Inventors: Ayman Almohsin, Doha (SA); Edreese Alsharaeh, Riyadh (SA); Mohan Raj Krishnan, Riyadh (SA); Mohieddin Alghazali, Udhailiyah (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/179,041

(22) Filed: Feb. 18, 2021

(65) Prior Publication Data

US 2022/0259488 A1  Aug. 18, 2022

(51) Int. Cl.
*E21B 43/12* (2006.01)
*E21B 33/138* (2006.01)
*C09K 8/92* (2006.01)
*C09D 133/26* (2006.01)
*C09K 8/03* (2006.01)
*B82Y 40/00* (2011.01)

(52) U.S. Cl.
CPC ............. *C09K 8/92* (2013.01); *C09D 133/26* (2013.01); *C09K 8/032* (2013.01); *B82Y 40/00* (2013.01); *C09K 2208/10* (2013.01)

(58) Field of Classification Search
None
See application file for complete search history.

(56) References Cited

U.S. PATENT DOCUMENTS 5,185,024 A   2/1993  Siemer et al.
6,516,885 B1  2/2003  Munday
(Continued)

FOREIGN PATENT DOCUMENTS

CN         104039917 A  *  9/2014  ............. C09K 8/516
WO     WO 2017052515       3/2017
(Continued)

OTHER PUBLICATIONS

Al-Muntasheri et al., "Investigation of a High Temperature Organic Water Shutoff Gel: Reaction Mechanisms," Society of Petroleum Engineers, Dec. 2006, 8 pages.
(Continued)

*Primary Examiner* — Charles R Nold
(74) *Attorney, Agent, or Firm* — Fish & Richardson P.C.

(57) ABSTRACT

Polyacrylamide (PAM)-coated nanosand that may be a relative permeability modifier (RPM) and that is applied to treat a wellbore in a subterranean formation. The treatment may be for excess water production. The PAM-coated nanosand is PAM-hydrogel-coated nanosand. The PAM-coated nanosand os nanosand coated with PAM hydrogel. The PAM hydrogel includes crosslinked PAM in water. Application of the PAM-coated nanosand may reduce water production from the subterranean formation into the wellbore. The PAM hydrogel of the PAM-coated nanosand may expand in a water zone of the subterranean formation to restrict water flow into the wellbore. The PAM hydrogel of the PAM-coated nanosand may contract in an oil zone of the subterranean formation so not to significantly restrict crude oil flow into the wellbore.

10 Claims, 12 Drawing Sheets

(56) References Cited

U.S. PATENT DOCUMENTS

| | | | |
|---|---|---|---|
| 7,677,313 | B2 | 3/2010 | Tremblay et al. |
| 8,557,916 | B1 | 10/2013 | Alsharaeh et al. |
| 8,853,301 | B2 | 10/2014 | Jing et al. |
| 9,315,721 | B2 | 4/2016 | Mahoney et al. |
| 9,464,504 | B2 | 10/2016 | Kakdjian et al. |
| 9,856,415 | B1* | 1/2018 | Leverson ............ C09K 8/64 |
| 9,932,521 | B2 | 4/2018 | Soane et al. |
| 9,951,593 | B2 | 4/2018 | Hussein et al. |
| 2014/0135237 | A1* | 5/2014 | Villarreal, Jr. ...... C09K 8/805 507/119 |
| 2015/0252250 | A1* | 9/2015 | Levey ............ E21B 43/267 507/224 |
| 2018/0022982 | A1* | 1/2018 | Sierra ............ C09K 8/035 166/292 |
| 2018/0163122 | A1 | 6/2018 | Panga et al. |
| 2018/0215996 | A1* | 8/2018 | Maxey ............ C09K 8/805 |
| 2019/0256770 | A1 | 8/2019 | He et al. |

FOREIGN PATENT DOCUMENTS

| WO | WO 2017105475 | 6/2017 |
|---|---|---|
| WO | WO 2019075314 | 4/2019 |
| WO | WO 2020223241 | 11/2020 |

OTHER PUBLICATIONS

Alsharaeh et al., "Evaluation of nanomechanical properties of (styrene-methyl methacrylate) copolymer composites containing graphene sheets," American Chemical Society, 2013, 11 pages.

Alsharaeh et al., "Microwave irradiation effect on the dispersion and thermal stability of RGO nanosheets within a polystyrene matrix," Materials, 2014, 7:212-224.

Dovan et al., "Delaying Gelation of Aqueous Polymers at Elevated Temperatures Using Novel Organic Crosslinkers. Society of Petroleum Engineers," SPE 37246, presented at the SPE International Symposimon Oilfield Chemistry, Houston, TX, Feb. 18-21, 1997, 11 pages.

Taha et al., "Nano Graphene Application Improving Drilling Fluids Performance," presented at the International Petroleum Technology Conference, Doha, Qatar, Dec. 6-9, 2015, 16 pages.

Tongwa et al., "Evaluation of a nanocomposite hydrogel for water shut-off in enhanced oil recovery applications: Design, synthesis, and characterization," J. Appl. Polym. Sci, 2012, 128:787-794.

Zolfaghari et al., "Preparation and characterization of nanocomposite hydrogels based on polyaclylamide for enhanced oil recovery applications," J. Appl. Polym. Sci., 2006, 100:2096-2103.

PCT International Search Report and Written Opinion in International Appln. No. PCT/US2022/016996, dated Jun. 2, 2022, 14 pages.

* cited by examiner

300

COATED NANOSAND AS RELATIVE PERMEABILITY MODIFIER

TECHNICAL FIELD

This disclosure relates to treating a wellbore or subterranean formation for excess water production in oil (and gas) production.

BACKGROUND

A wellbore in a subterranean formation in the Earth crust may be treated. The wellbore treatments may be to facilitate production of hydrocarbon, such as crude oil or natural gas, from the subterranean formation. The treatments of the wellbore may treat the subterranean formation. A wellbore treatment may include to treat problematic sections of a wellbore. An example of a problematic section of a wellbore is a water zone in which water enters the wellbore from the hydrocarbon formation or underlying water aquifer. The influx of water into the wellbore during drilling and during the subsequent production of oil and gas can add cost. The production of water along with the oil and gas from the hydrocarbon formation can lead to surface processing of the water and injection of the water back into the hydrocarbon formation for disposal or pressure maintenance. Such processing and injection of water produced from the wellbore water zone causes increased costs of the oil and gas production.

SUMMARY

An aspect relates to a method of treating a wellbore formed in a subterranean formation, including applying polyacrylamide (PAM)-coated nanosand as a relative permeability modifier (RPM) to the wellbore. The PAM-coated nanosand includes nanosand coated with PAM hydrogel. The PAM hydrogel includes crosslinked PAM in water. The method includes reducing water production from the subterranean formation into and through the wellbore by applying the PAM-coated nanosand to the wellbore into the subterranean formation.

Another aspect relates to a method of forming PAM-coated nanosand, the method including adding PAM, crosslinker, and nanosand to water to give a mixture including the PAM, the crosslinker, the nanosand, and the water. The method includes heating the mixture to crosslink the PAM to give crosslinked PAM and PAM hydrogel including the crosslinked PAM and the water. The PAM-coated nanosand is the nanosand coated with the PAM hydrogel.

Yet another aspect relates to a relative permeability modifier (RPM) that is PAM-coated nanosand including nanosand coated with PAM hydrogel. The PAM hydrogel includes crosslinked PAM in water.

The details of one or more implementations are set forth in the accompanying drawings and the description below. Other features and advantages will be apparent from the description and drawings, and from the claims.

DETAILED DESCRIPTION

Figure 1:
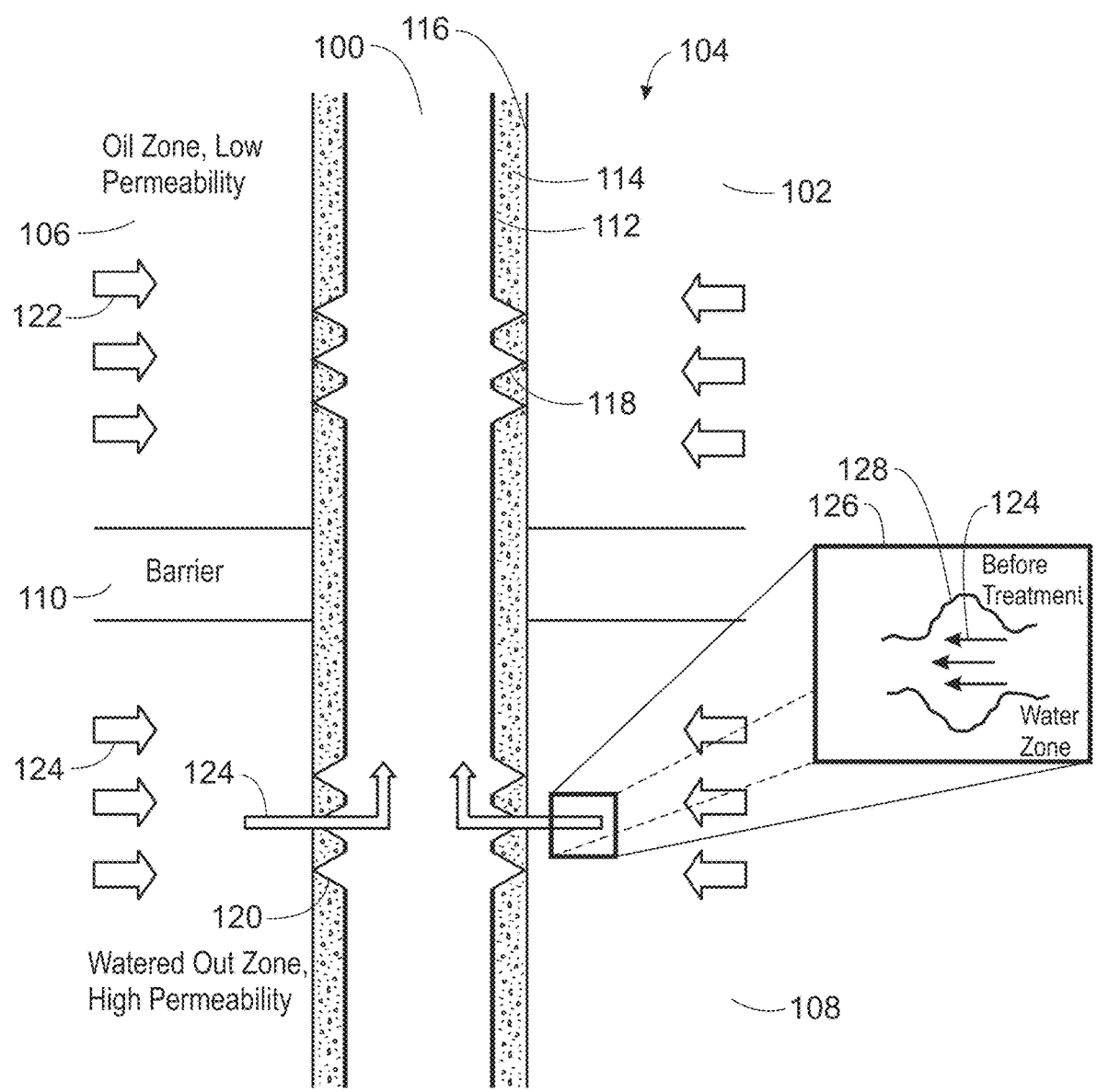
FIG. 1 is a diagram of a wellbore formed in a subterranean formation in the Earth crust.

Some aspects of the present disclosure are directed to reducing water flow into a wellbore from the subterranean formation, such as at a water zone of the wellbore. The incoming water flow is reduce by applying nanosand coated with polyacrylamide (PAM) hydrogel to the wellbore. The nanosand coated with PAM hydrogel treats the subterranean formation adjacent the wellbore. This treatment material may be labeled or act as a relative permeability modifier (RPM). To prepare this RPM, sand is reduced in particle such as by grinding or milling (e.g., ball milling) to give the nanosand. The nanosand is mixed with PAM and crosslinkers in water and cured to give the PAM-coated nanosand (PAM-hydrogel-coated nanosand). In application, this PAM-coated nanosand (e.g., as an RPM) reduces the permeability of the subterranean formation at and near the wellbore. This RPM reduces the permeability of the subterranean formation to water flow at the water zone to a greater degree than reduces oil flow of the subterranean formation at an oil zone because of hydrogel dehydration of the RPM at the oil zone. The RPM may be known in the context of relative permeability modification or disproportionate permeability reduction (DPR).

High water-cut (the amount of water in produced oil and gas) has generally become a worldwide challenge for oil and gas production. To accommodate produced water (typically undesirable) can involve relatively extensive efforts to process and dispose the water. Moreover, water production in oil and gas wells can increase due to maturity of the well. The response to such increased water production can entail expanding water handling facilities and incurring high-power consumption costs. In mature oil fields, high water cuts can be difficult for operators to face. An option to overcome this challenge is injection (e.g., bullhead injection) of chemicals capable of reducing water permeability more than oil permeability. These treatment chemicals can be described as RPM materials. The injection of the RPM into the wellbore can be by a surface pump. Bullhead injection can be injection (e.g., via a surface pump) and not utilizing mechanical isolation for the application in the wellbore. Application of the RPM can include conformance-improvement water shutoff treatments applied to production wells of matrix-rock oil reservoirs.

In certain embodiments, the preparation of coated nanosand as an RPM may involve processing of macro sand into micro sand or nanosand. The macro sand may be natural sand obtained from Kingdom of Saudi Arabia (KSA) or other regions of the world. The nanosand may be prepared by grinding or milling (e.g., ball milling) the macro sand. The prepared nanosand can be coated with PAM hydrogel. The weight ratio of the PAM to nanosand may be, for example, in the range of 0.1 to 1. This weight ratio includes the PAM (and not the water of the hydrogel) versus the nanosand.

The PAM-coated nanosand may be prepared through an in-situ technique. The in-situ preparation is in-situ synthesis (the in-situ method) forming the RPM prior to injection of the RPM to the wellbore. For the synthesis, a PAM solution in water is prepared, for example, at a PAM concentration in the water of less than 6 weight percent (wt %).

A crosslinker (e.g., organic crosslinker) may be added to the PAM solution for crosslinking of the PAM including during curing. The organic crosslinker may be, for example, hydroquinone (HQ), hexamethylenetetramine (HMT), and the like. More than one crosslinker may be employed. The concentration of the organic crosslinker (or combined concentration of multiple organic crosslinkers) in the PAM solution may be, for example, in the range of 0.1 wt % to 0.6 wt %, or at least 0.3 wt %. In some implementations, two crosslinkers are added to the PAM solution, such as HQ and HMT. In one implementation, the HQ and HMT are added at about a 1:1 weight ratio with respect to each other. A salt, such as potassium chloride (KCl), may be added to the PAM solution, for example, at a concentration of at least 2 wt % in the PAM solution. The salt (e.g., KCl) may advance or promote crosslinking of the PAM.

The prepared PAM solution with crosslinker(s) and optionally salt (e.g., potassium chloride) may be mixed with a specified amount of nanosand, and cured (e.g., at a temperature of at least 150° C. for at least 48 hours) to produce the PAM-coated nanosand. Again, this PAM-coated nanosand may be capable to reduce the permeability of the subterranean formation to water flow to a greater degree than oil flow due to dehydration of the PAM hydrogel with respect to the oil.

FIG. 1 is a wellbore 100 formed in a subterranean formation 102 in the Earth crust. The uphole portion toward the Earth surface is indicated by reference numeral 104. The wellbore 100 gives water production or excess water production. The wellbore 100 in FIG. 1 is depicted before treatment with the present RPM that is PAM-coated nanosand.

The subterranean formation 102 includes an oil zone 106 and a water zone 108 separated by a natural barrier 110. The oil zone 106 is a hydrocarbon-bearing strata of the formation 102. The water zone 108 is a portion of the formation 102 responsible for excess water production. The water zone 108 may have higher permeability than the oil zone 106. The water zone 108 may be a watered out zone that was a zone in which a stable oil rate was previously produced but has watered out. The natural barrier 110 (e.g., shale or anhydrite) may generally be impermeable. In one implementation, the oil zone 106 produces at 100% oil cut and the water zone 108 produces at 100% water.

In the illustrated embodiment, the wellbore 100 includes casing 112. Cement 114 is disposed between the casing 112 and the formation face 116. Thus, the wellbore 100 is a cemented cased wellbore. The wellbore 100 can include openhole portions (not shown). Perforations 118 are formed through the casing 112 and cement 114 into the formation 102 in the oil zone 106. Likewise, perforations 120 are formed through the casing 112 and cement 114 into the formation 102 in the water zone 108. The perforations 118 and 120 allow for fluid flow between the interior cavity (e.g., inner diameter of the casing 112) of the wellbore 100 and the subterranean formation 102.

During production, at the oil zone 106, crude oil 122 flows (is produced) from the subterranean formation 102 through the perforations 118 into the wellbore 100 and upward through the wellbore 100 to the Earth surface. In this illustration, at the water zone 106, primarily water 124 flows (is produced as unwanted water production) from the subterranean formation 102 through the perforations 120 into the wellbore 100 and upward through the wellbore 100 to the Earth surface. An enlarged view 126 of the water 124 flow through the subterranean formation 102 is given. The water 124 flows through the rock structure 128 (e.g., including flow channel) that may represent the permeability of the formation 102 in the water zone 108.

Figure 2:
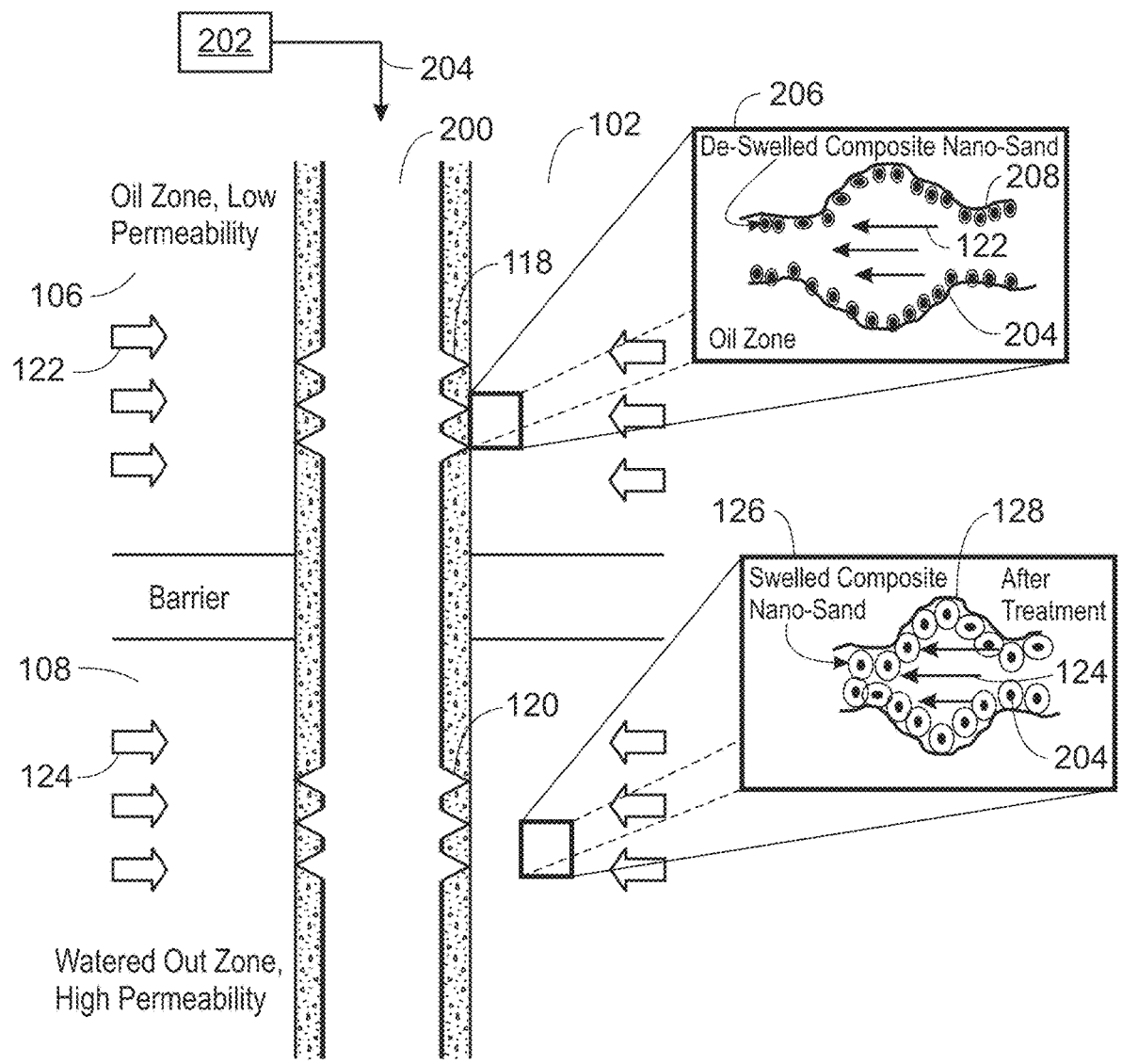
FIG. 2 is the wellbore of FIG. 1 after treatment with polyacrylamide (PAM)-coated nanosand as a relative permeability modifier (RPM).

FIG. 2 is a wellbore 200 that is the wellbore 100 of FIG. 1 after treatment with PAM-coated nanosand as an RPM. The swelled PAM-coated nanosand as water shutoff treatment is applicable in the water producing zone 108 (e.g., bottom watered out zone). The top oil zone 106 wherein the PAM-coated nanosand is de-swelled (dehydrated) allows crude oil 122 to flow.

The PAM of the PAM-coated nanosand is PAM hydrogel that is primarily water. As used herein, the phrase PAM-coated nanosand may be nanosand (nanosand particles) coated with PAM hydrogel or otherwise enveloped by the PAM hydrogel. The PAM-coated nanosand is PAM-hydrogel-coated nanosand. The PAM-coated nanosand may be characterized as PAM-nanosand composite that is a composite of PAM and nanosand.

For treatment of the wellbore, the PAM-coated nanosand may be pumped into the wellbore from the Earth surface. This RPM as PAM-coated nanosand may be pumped throughout the open range (depth) of the wellbore as in a bullhead injection, without use of mechanical means to treat localized areas. Therefore, both the oil zone 106 and water zone 108 may receive the RPM.

The RPM 204 (PAM-coated nanosand) may be injected into the wellbore by a surface pump 202 at the Earth surface. The RPM 204 may flow through the perforations 118 at the oil zone 106 into the subterranean formation 102 adjacent and near the perforations 118. The RPM 204 may flow through the perforations 120 at the water zone 108 into the subterranean formation 102 adjacent and near the perforations 120.

The enlarged view 126 in FIG. 2 depicts the RPM 204 in a swollen state within the rock structure 128 to restrict permeability of the formation 102 at the water zone 108. The PAM hydrogel of the RPM 204 expands (further hydrogel hydration) due to the presence of water in the water zone 108. Thus, during production, the water flow 124 into the wellbore is restricted (lowered, lessened) or stopped (prevented). The flow rate in mass or volume per time of the water flow 124 is lowered due to the presence of the swollen RPM 204. Therefore, the water cut in the oil produced will be less.

The enlarged view 206 is of the subterranean formation 102 adjacent or near the perforations 118 in the oil zone 106. The RPM 204 within the rock structure 208 in the oil zone 106 is in a contracted state due to the presence of oil (and may be include other hydrocarbons), and presence of little or no water, in the oil zone 106. The PAM hydrogel of the RPM 204 is subjected to hydrogel dehydration in the oil zone 106. Therefore, the effect of the RPM 204 on the formation permeability is less in the oil zone 106 than in the water zone 108. The application of the RPM 204 reduces formation permeability more in the water zone 108 than in the oil zone 106. During production, in some implementations, the presence of the RPM 124 may have little or no impact on the oil 122 flow into the wellbore from the oil zone 106 of the subterranean formation 102.

Figure 3:
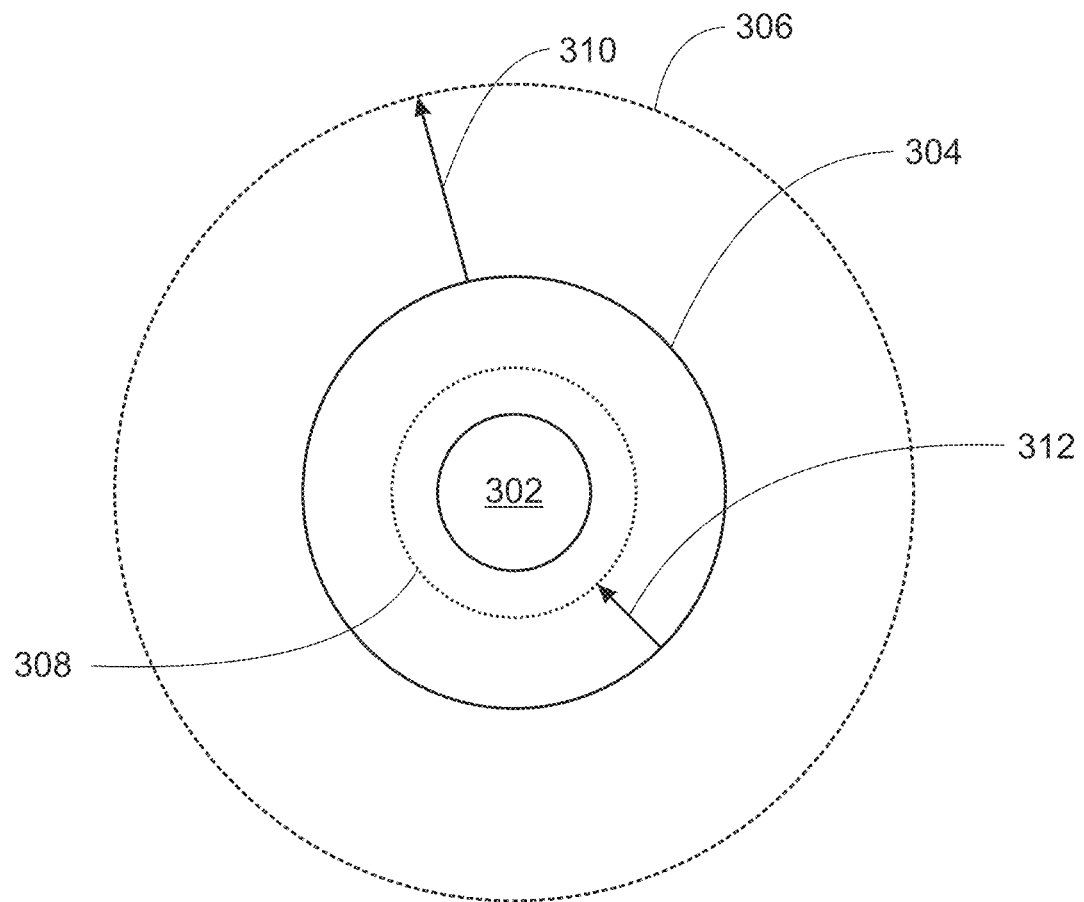
FIG. 3 is a diagram of an RPM that is PAM-coated nanosand that is nanosand coated with PAM hydrogel.

FIG. 3 is RPM 300 that is PAM-coated nanosand that is nanosand coated with PAM hydrogel. The PAM hydrogel is crosslinked PAM in water. The PAM hydrogel may be characterized as a hydration/dehydration layer. The RPM 300 may be analogous to the RPM 204 of FIG. 2. The RPM 300 as depicted includes a nanosand particle 302 of the nanosand. The particle size (diameter) of the nanosand particle 302 may be, for example, in the range of 5 nanometers (nm) to 100 nm.

The RPM 300 in an initial state has the PAM hydrogel with an initial diameter 304. The RPM 300 in an expanded state has the PAM hydrogel with an expanded diameter 306. The RPM in a contracted state has the PAM hydrogel with a contracted diameter 308.

The RPM 300 in the initial state may be the RPM 300 as prepared or synthesized and is the nanosand particle 302 coated with the PAM hydrogel having the initial diameter 304. The initial diameter 302 is the diameter of the PAM hydrogel surrounding the nanosand particle 302 as prepared. During application of the RPM 300 to a wellbore in the treatment of the wellbore to treat excess water production, the diameter of the PAM hydrogel around the nanosand particle 302 may change.

The diameter of the PAM hydrogel around the nanosand particle 302 may increase 310 from the initial diameter 304 to the expanded diameter 306 for the RPM 300 in a water zone. Again, this may be the expanded state of the RPM 300. The diameter of the PAM hydrogel may increase due to the presence of the water giving increased hydration of the PAM hydrogel. The initial diameter 304 and increased diameter (expanded diameter 306) may significantly reduce permeability of the water zone of the formation adjacent or near the wellbore. Thus, during production, the RPM 300 as applied may restrict water flow from the water zone of the subterranean formation into the wellbore.

The diameter of the PAM hydrogel may decrease 312 from the initial diameter 304 to the contracted diameter 308 for the RPM 300 present in an oil zone. Again, this may be the contracted state of the RPM 300. The diameter of the PAM hydrogel may decrease due to the presence of oil and little or no water resulting in hydrogel dehydration (dehydration of the PAM hydrogel). The decreased diameter (contracted diameter 308) may significantly reduce the impact of the RPM 300 on permeability of the oil zone of the formation. Thus, during production, the RPM 300 as applied may have little or no impact on crude oil flow from the oil zone of the subterranean formation into the wellbore.

The RPM 300 in the initial state or expanded state reduces formation permeability more than in the contracted state. The RPM 300 with the PAM hydrogel having initial diameter 304 or increased diameter 306 reduces formation permeability more than with the PAM hydrogel having decreased diameter 308. The RPM 300 in the expanded state with the PAM hydrogel having increased diameter 306 as applied in a water zone reduces formation permeability more than in the contracted state with the PAM hydrogel having decreased diameter 308 as applied in a water zone.

The PAM hydrogel layer may absorbs a substantial amount of water (e.g., an increase by at least 1,000 wt %) and swelled so that the PAM hydrogel layer blocks (e.g., completely blocks) water channels in the subterranean formation. In contrast, at the oil zone, the hydrogel of the PAM-coated nanosand is de-swelled (e.g., completely deswelled) and thus the oil permeation (permeability of the subterranean formation in the oil zone) is little affected or unaffected.

As indicated by FIGS. 2 and 3, a mechanism for the RPM material is with respect to gel is shrinking and swelling when exposed to crude oil and water, respectively, by which crude oil will move through the gel. As indicated, hydrogel-coated nanosand is an implementation utilizing nanosand as core coated with hydrogel. The ball milling of the KSA macro sand to produce nanosand that can be utilize as a core for PAM hydrogel. The PAM-hydrogel-coated nanosand as relative permeability modifier material can be utilized for water shutoff treatments to solve the excess water production. The technique may give a water control material that can be attractive for water shutoff application in mature oil fields with excessive water production, including at high temperatures (e.g., 150° C.).

Embodiments of the PAM-coated nanosand disclosed herein may be utilized in treatments in a wellbore in a subterranean formation. The treatments may address excess water production by employing the PAM-coated nanosand to plug formation permeability in a water zone. Conventional polymer-based gel systems for water shut-off treatment in a wellbore in a subterranean formation may degrade at a significant rate over time due to the temperature of the subterranean formation. Embodiments of PAM-coated nanosand (PAM-hydrogel-coated nanosand) herein as RPM may have a high thermal degradation temperature (e.g., greater than 175° C.).

The PAM-coated nanosand may be cost-effective in the sense that sand can be abundantly available, especially in certain regions of the world. The nanosand in the nanosand-polymer composite may be prepared by milling sand, such as silica sand that is primarily silicon dioxide (quartz). In some instances, the sand to be milled is natural desert sand obtained from Saudi Arabia. The milling of the sand may involve, for example, ball milling the sand for several hours. In implementations, the particle size of the nanosand may generally be less than 100 nm.

To prepare or form the nanosand, natural macro sand (e.g., obtained from KSA) may be ground or milled (e.g., ball milled) for at least 12 hours, or in ranges of 1 hour to 12 hours, or 5 hours to 24 hours, and the like. As discussed below, the nanosand is mixed with a PAM solution, and the PAM crosslinked at a curing temperature. The curing (crosslinking) may gel the PAM solution giving PAM gel or hydrogel. The in-situ synthesis solution may be heated and maintained at a specified temperature for a specified time to cure the PAM-coated nanosand. The PAM-coated nanosand as prepared (in an initial state prior to application) may be at least 90 wt % water. The PAM-coated nanosand may be PAM hydrogel (including crosslinked PAM and water) enveloping nanosand particles.

Figure 4:
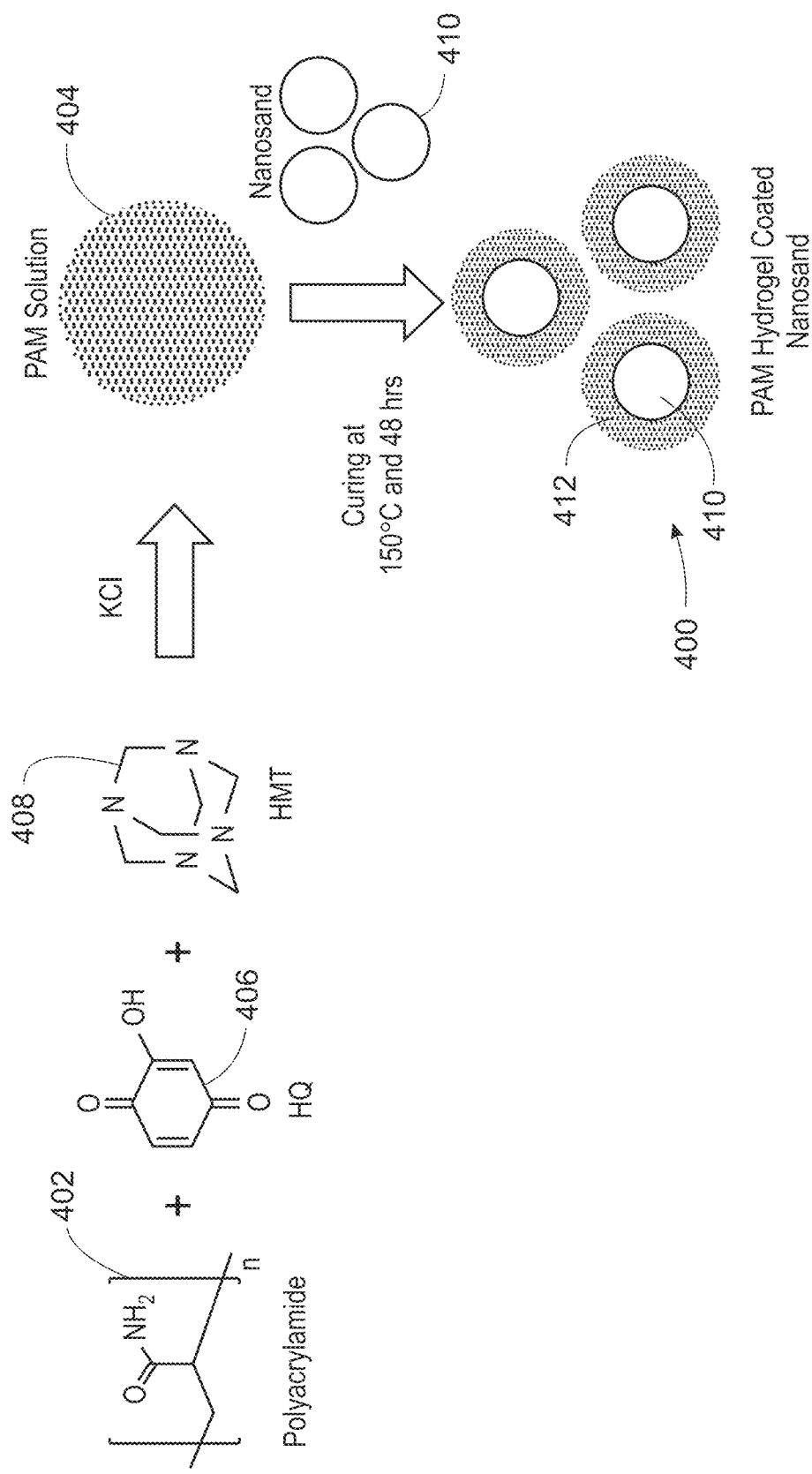
FIG. 4 is a diagram depicting formation of PAM-coated nanosand that is an RPM.

FIG. 4 is a diagram depicting formation of PAM-coated nanosand 400 that is an RPM. The PAM-coated nanosand 400 as RPM may be analogous to the RPM 300 of FIG. 3 and the RPM 204 of FIG. 2.

The forming of the PAM-coated nanosand 400 may be PAM hydrogel coating of the nanosand by mixing a PAM solution with nanosand followed by high-temperature curing (e.g., at least 150° C.). The FIG. 4 diagram may represent synthesis (e.g., in-situ synthesis) performed commercially at industrial scale or with respect to the laboratory Example below. The formation of the PAM-coated nanosand 400 may be in-situ synthesis in a vessel.

A mixture of PAM 402 and water is prepared in the vessel to give a PAM solution 404. The PAM 402 added may be low molecular-weight PAM. The PAM 402 molecular weight may be, for example, less than 1,600,000 Daltons. The PAM 402 may be soluble in the water. The concentration of the PAM 402 in the mixture of the PAM 402 and water (as a PAM hydrogel solution 404) may be, for example, at least 4 wt %, less than 4 wt %, or in ranges of 1 wt % to 10 wt %, 1 wt % to 9 wt %, 1.5 wt % to 8 wt %, or 2 wt % to 6 wt %. Once the PAM 402 is crosslinked, the PAM solution 404 may be characterized as PAM hydrogel or PAM hydrogel solution.

An organic crosslinker (e.g., HQ, HMT, etc.) may be added to the vessel with the PAM 402 and water. The concentration of the organic crosslinker in the PAM solution 404 may be, for example, at least 0.4 wt % or at least 0.6 wt %, or in the range of 0.2 wt % to 1 wt %. In the illustrated embodiment, two organic crosslinkers 406 and 408 are added. The concentration of the combination of the two organic crosslinkers 406 and 408 in the solution 404 having PAM 402 and water may be at least 0.4 wt % or at least 0.6 wt %, or in the range of 0.2 wt % to 1 wt %. In implementations, the crosslinker 406 may be HQ and the crosslinker 408 may be HMT. In those implementations, the concentration of each of HQ and HMT individually in the solution 404 may be at least 0.2 wt % or at least 0.3 wt %, or in the range of 0.1 wt % to 0.5 wt %. In one implementation, the weight ratio of HQ to HMT is about 1.

A salt, such as KCl, may also be added. The concentration of the salt (e.g., KCl) in the solution 404 may be at least 0.2 wt %, or in the range of 0.05 wt % to 0.5 wt %. The mixture may be labeled as the PAM solution 404. In some implementations, the solution or mixture may be flushed or purged with an inert gas, such as nitrogen gas.

Nanosand 410 may be mixed with the PAM solution 404 in the vessel. The concentration of the nanosand 410 in the PAM solution 404 may be, for example, in a range of 0.8 wt % to 4 wt %. In implementations, the weight ratio of the PAM 402 to the nanosand 410 may generally be less than 1.

The mixture of the PAM 402, organic crosslinker(s), salt, and water may be mixed or agitated as an in-situ synthesis mixture or solution. The PAM solution 404 as a mixture of PAM 402, crosslinker(s) (e.g., 406, 408), and salt (e.g., KCl), and having the nanosand 410 is mixed in the vessel (e.g., via a stirred mixer, agitator, blender, etc.) and heated to a curing temperature (e.g., at least 150° C.). The solution 404 (e.g., an in-situ synthesis solution) with nanosand 410 may be maintained at the curing temperature for a curing time (e.g., at least 48 hours). In some implementations, the solution 404 (with or without nanosand 410) may be flushed (purged) with an inert gas, such as nitrogen gas, prior to heating to the curing temperature. The curing temperature may be at least 100° C., at least 175° C., less than 150° C., or in ranges of 125° C. to 200° C. or 125° C. to 175° C. The curing time may be at least 12 hours, at least 24 hours, less than 48 hours, or in ranges of 12 hours to 60 hours or 24 hours to 48 hours. The heating may be, for example, by a heating jacket on the vessel that receives a heating fluid, pumped recirculation heating via a conduit through a heat exchanger (e.g., shell-and-tube heat exchanger), external electrical heaters on the vessel, and so on. The weight ratio of the PAM 402 (including as crosslinked) to the nanosand 410 to in the PAM solution 404 (including as cured) may be specified. This weight ratio may be, for example, less than 1.

The PAM-coated nanosand 400 may be nanosand 410 coated with PAM hydrogel 412. The PAM hydrogel 412 is the PAM 402 (as crosslinked in the curing) in water. As indicated, the crosslinking may be promoted by the heating in the presence of the crosslinker(s) (e.g., 406, 408). For instance, as indicated, the PAM 402 crosslinking (e.g., via HQ and HMT) may be achieved by heating the solution, for example, to at least 150° C. The PAM 412 in the PAM-coated nanosand 400 may be PAM (in water as hydrogel) crosslinked with organic crosslinking agent(s) (e.g., HQ and/or HMT) in presence of salt (e.g., KCl). For the combined PAM hydrogel 412 and nanosand 410 in the PAM-coated nanosand 400, the PAM hydrogel 412 may be, for example, at least 98 wt % of the combined PAM hydrogel 412 and nanosand 410. The nanosand 410 may be, for example, less than 2 wt % of the combined PAM hydrogel 412 and nanosand 410. In implementations, at least 90 wt % (or at least 94 wt %) of the PAM-coated nanosand 400 may be water.

The PAM-coated nanosand may be characterized as PAM-nanosand composite that is a composite of PAM and nanosand. In some instances, the composite structure may be a core-shell structure with the nanosand as core and the PAM (PAM hydrogel) as shell, and that is applicable as an RPM with the PAM hydrogel expanding in water zones and contracting in oil zones. In some instances, the structured formed may be a composite that is a PAM matrix reinforced with nanosand as nanofiller, and that is applicable as an RPM with the PAM hydrogel expanding in water zones and contracting in oil zones.

Figure 5:
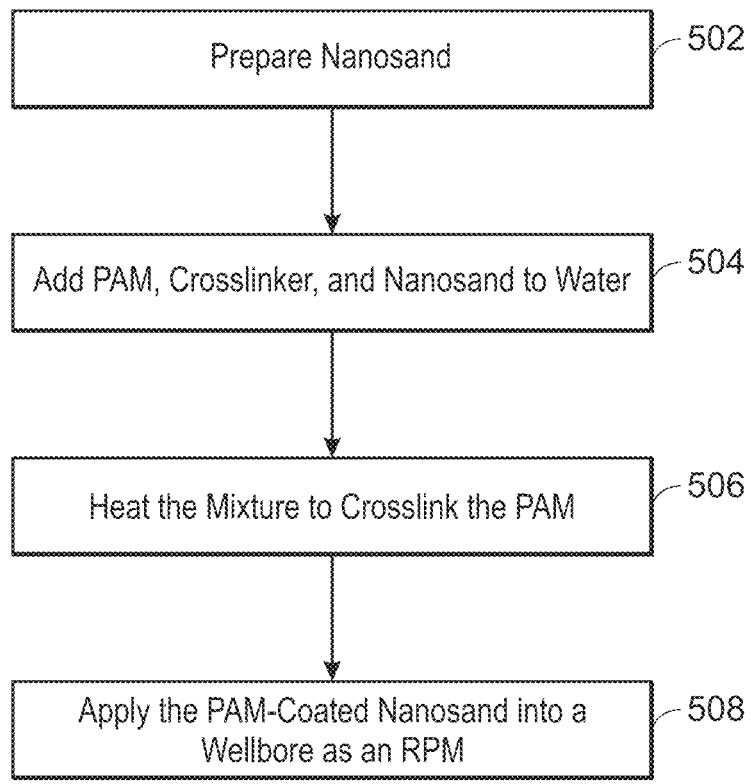
FIG. 5 is a block flow diagram of a method of preparing PAM-coated nanosand.

FIG. 5 is a method 500 of preparing (forming, synthesizing) PAM-coated nanosand. The PAM-coated nanosand may be formed by in-situ synthesis in a vessel. The PAM-coated nanosand formed may be applied as an RPM. The PAM-coated nanosand may be an RPM.

At block 502, the method may include preparing (forming) nanosand. Natural (macro) sand may be obtain and ground or milled (e.g., ball milled) for several hours (e.g., at least 12 hours) to give nanosand having a particle size less than 100 nm. A ball mill may be a type of grinder. A ball mill may include a hollow cylindrical shell configured to rotate about its axis and partially filled with balls. The grinding media are the balls, which may be made of steel (chrome steel), stainless steel, or ceramic, and so on. The inner surface of the cylindrical shell may be lined with an abrasion-resistant material.

At block 504, the method includes adding PAM, crosslinker (e.g., HQ or HMT, or both), and the nanosand to water to give a mixture. The mixture includes the PAM, the crosslinker, the nanosand, and the water. The mixture may be characterized as a PAM solution having the crosslinker and the nanosand. The mixture may be prepared (formed) in a vessel. The PAM and crosslinker may be incorporated at the concentrations discussed above. The weight ratio of PAM to nanosand may be, for example, the range of 0.1 to 1, as discussed. The method may include adding salt (e.g., KCl) to the water in the vessel. If so, the mixture will include the salt. In some implementations, the mixture may be flushed (e.g., purged for at least 30 seconds) with an inert gas, such as nitrogen gas.

The method may include mixing the mixture in the vessel to give dispersion of the components throughout the mixture. To perform the mixing, the vessel may have an agitator (e.g., rotating mechanical agitator) or blender, or be a stirred-mixer vessel.

At block 506, the method includes heating the mixture (e.g., to 150° C. for at least 48 hours for curing) to crosslink the PAM to give crosslinked PAM and PAM hydrogel including the crosslinked PAM and the water. The PAM-coated nanosand is the nanosand coated with the PAM hydrogel.

At block 508, the method may include applying the PAM-coated nanosand as an RPM into a wellbore in a subterranean formation. The PAM-coated nanosand may be first collected from the vessel or applied directly from the vessel. In some implementations, the vessel is disposed at the well site having the wellbore. In those implementations, the PAM-coated nanosand may be prepared (formed) at the well site in the vessel, and applied into the wellbore from the vessel. In other implementations, the vessel is offsite and the PAM-coated nanosand is not applied (pumped) from the vessel.

The PAM-coated nanosand may be pumped (e.g., via a surface pump) through the wellbore into the subterranean formation. The PAM hydrogel of the PAM-coated nanosand may expand in a water zone of the subterranean formation to reduce water flow from the subterranean formation into the wellbore during production. The PAM hydrogel of the PAM-coated nanosand may contract in an oil zone of the subterranean formation so not to significantly affect crude oil flow from the subterranean formation into the wellbore during production.

Figure 6:
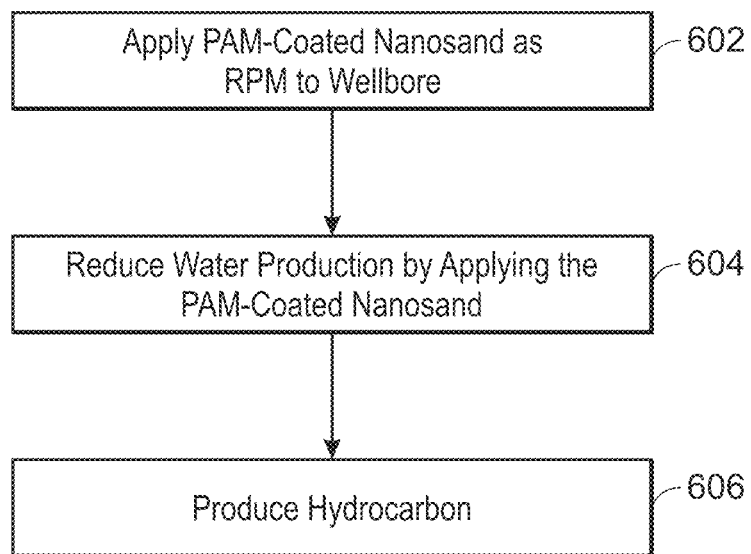
FIG. 6 is a block flow diagram of a method of treating a wellbore formed in a subterranean formation.

FIG. 6 is a method 600 of treating a wellbore in a subterranean formation. The wellbore may be formed through both an oil zone and a water zone of the subterranean formation.

At block 602, the method includes applying PAM-coated nanosand as an RPM to the wellbore. The PAM-coated nanosand includes nanosand coated with PAM hydrogel. The PAM hydrogel includes crosslinked PAM in water. The PAM-coated nanosand is generally PAM-hydrogel-coated nanosand and may be an RPM. The PAM hydrogel of the PAM-coated nanosand may expand in a water zone of the subterranean formation. The PAM hydrogel of the PAM-coated nanosand may contract in an oil zone of the subterranean formation Applying the PAM-coated nanosand may involve pumping the PAM-coated nanosand into the wellbore from an Earth surface. Applying the PAM-coated nanosand may involve flowing the PAM-coated nanosand through the wellbore into the subterranean formation. Applying the PAM-coated nanosand may be treating the wellbore for excess water production.

Applying the PAM-coated nanosand may include a bullhead injection of the PAM-coated nanosand. Applying the PAM-coated nanosand may include flowing the PAM-coated nanosand through the wellbore into an oil zone of the subterranean formation and into a water zone of the subterranean formation, wherein the PAM-coated nanosand reduces permeability of the water zone more than reduces permeability of the oil zone. In some implementations, the PAM-coated nanosand does not reduce the permeability of the oil zone At block 604, the method includes reducing water production from the subterranean formation through the wellbore by applying the PAM-coated nanosand to the wellbore. In other words, with application (presence) of the PAM-coated nanosand, the amount of water produced in subsequent production may be reduced. The method may include reducing permeability of a water zone of the subterranean formation by applying the PAM-coated nanosand, wherein applying (block 602) the PAM-coated nanosand includes flowing the PAM-coated nanosand through the wellbore into the water zone.

At block 606, the method may include producing hydrocarbon through the wellbore from the subterranean formation. The hydrocarbon may include crude oil or natural gas, or both. The produced fluid including the hydrocarbon and flowing through the wellbore to Earth surface from the subterranean formation may include less water than before application (blocks 602, 604) of the PAM-coated nanosand. The application of the PAM-coated nanosand may reduce the water content in the produced fluid (including hydrocarbon).

An embodiment may be an RPM that is PAM-coated nanosand that is nanosand coated with PAM hydrogel. The PAM hydrogel is crosslinked PAM in water. In implementations, at least 90 weight percent (wt %) of the PAM-coated nanosand is the water. The concentration of the crosslinked PAM in the PAM-coated nanosand may be, for example, in a range of 1 wt % to 9 wt %. The nanosand may have a particle size, for example, less than 100 nm. A weight ratio of the crosslinked PAM to the nanosand in the PAM-coated nanosand may be, for example, in a range of 0.1 to 1. The PAM hydrogel may expand in response to the RPM in a water zone of a subterranean formation. The PAM hydrogel may contract in response to the RPM in an oil zone of the subterranean formation.

EXAMPLE

To prepare (produce) the nanosand in the Example, KSA-obtained sand (natural macro sand) was ball milled for different times ranging from 1 hour to 12 hours. The nanosand was characterized using x-ray diffraction (XRD) (see FIG. 7). The nanosand obtained from ball milling for 12 hours gave nanosand particles having a particle size as small as 9 nm. The nanosand formed by ball milling for 12 hours was utilized in the preparation of the PAM-coated nanosand in the Example.

Figure 7A:
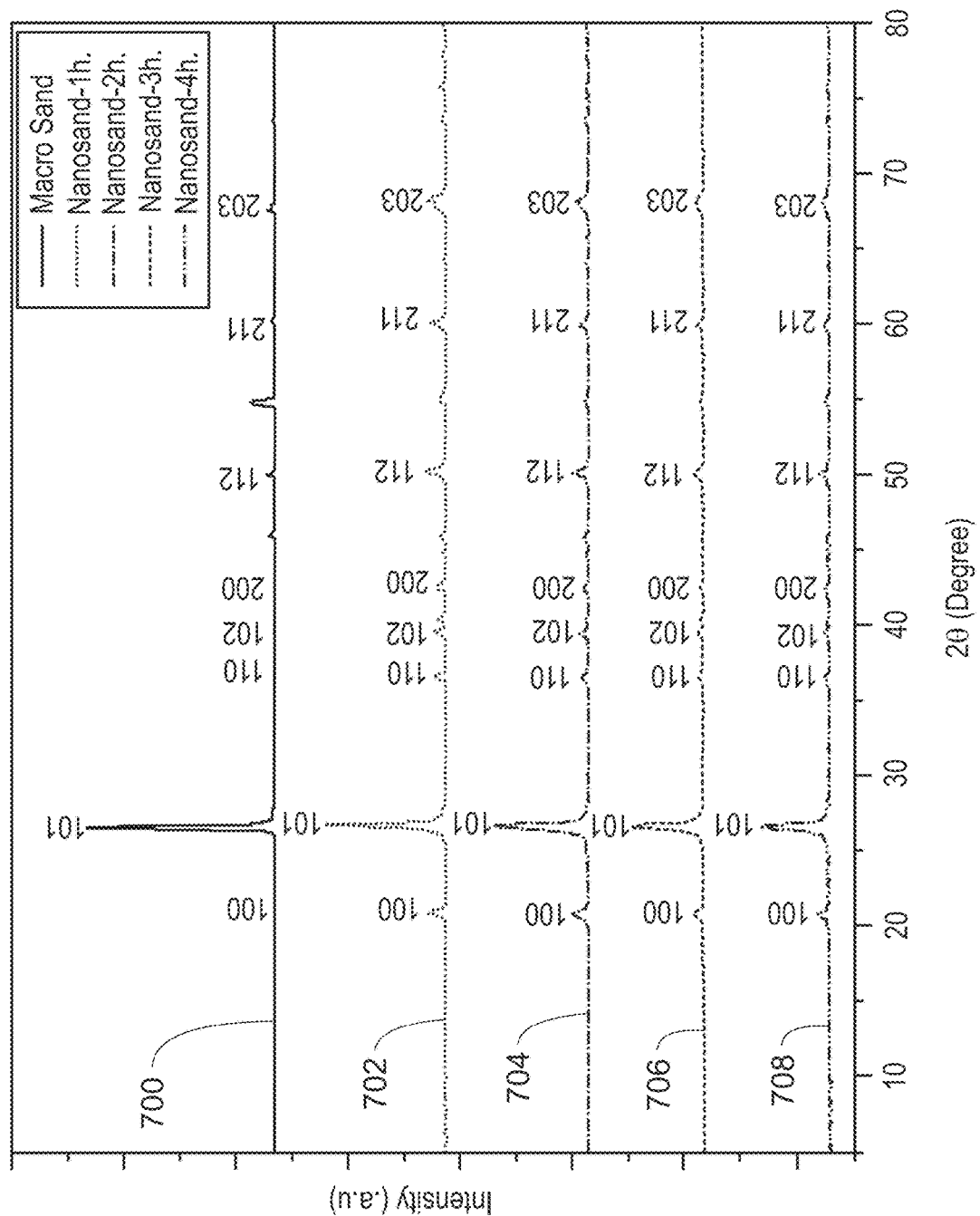
FIGS. 7A, 7B, and 7C are plots of x-ray diffraction (XRD) patterns of the nanosand prepared in the Example in comparison to the macro sand.
Figure 7B:
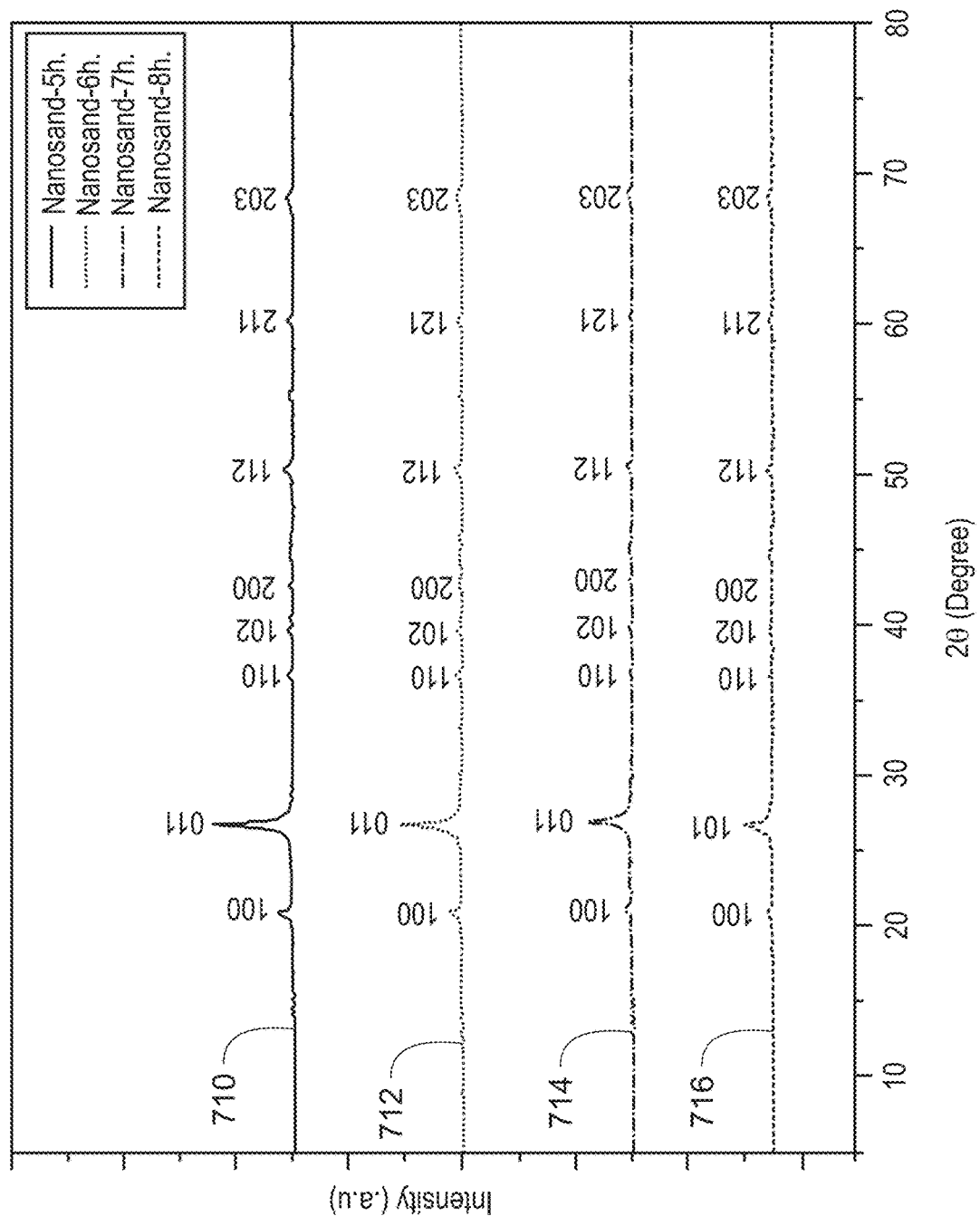
Figure 7C:
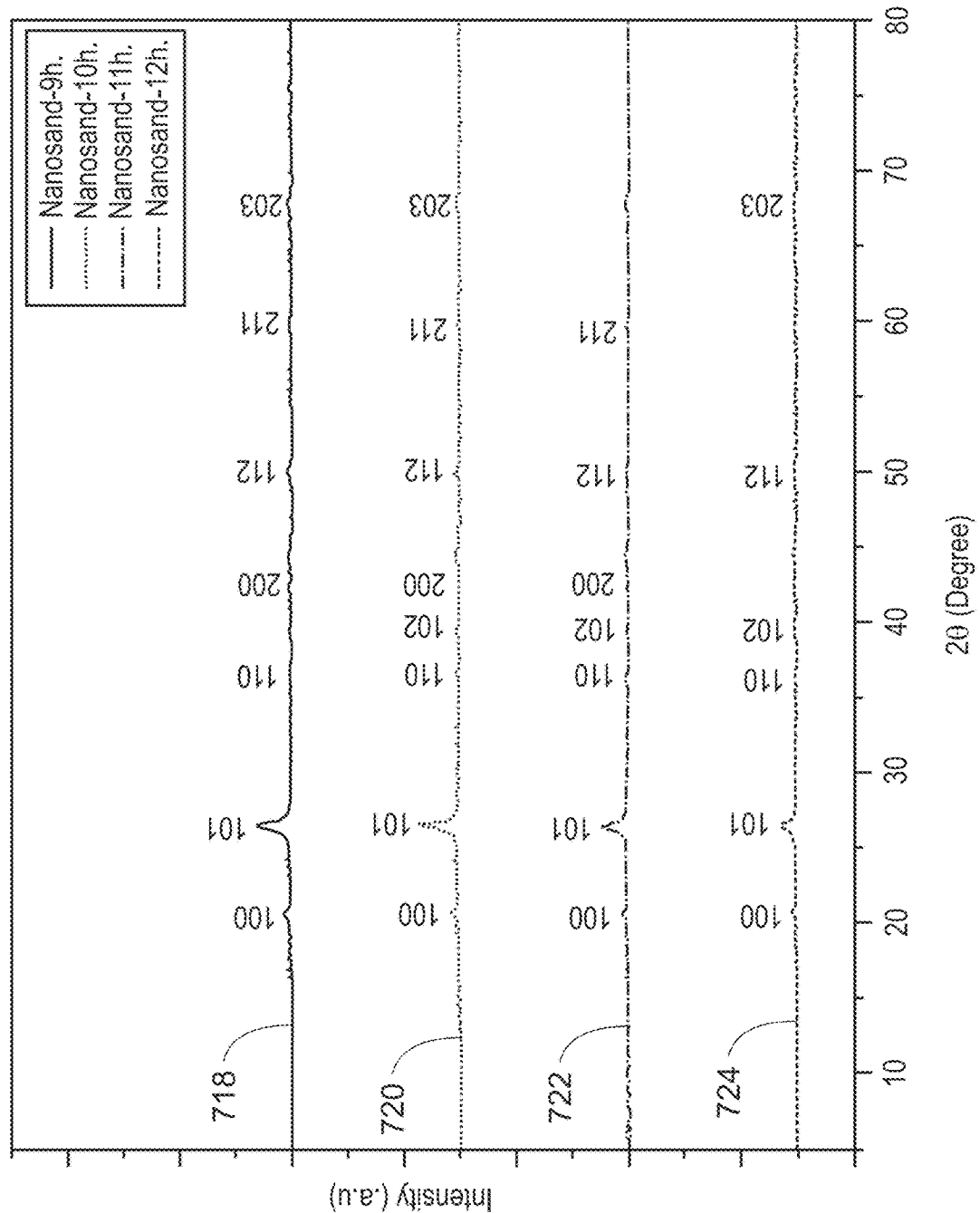

FIG. 7A, FIG. 7B, and FIG. 7C are three plots, respectively, of XRD patterns of the prepared nanosand in comparison to the macro sand. The plots are intensity versus the scattering angle. The intensity is in arbitrary units (a.u.). The scattering angle (or diffraction angle) is 2-theta in degrees. The three digit numbers in brackets are Miller indices (the diffracting planes).

The plot in FIG. 7A includes the XRD pattern of the macro sand 700 and the respective XRD patterns of the nanosand after ball milling the macro sand for 1 hour 702, 2 hours 704, 3 hours 706, and 4 hours 708. The plot in FIG. 7B includes the respective XRD patterns of the nanosand after ball milling the macro sand for 5 hours 710, 6 hours 712, 7 hours 714, and 8 hours 716. The plot in FIG. 7C includes the respective XRD patterns of the nanosand after ball milling the macro sand for 9 hours 718, 10 hours 720, 11 hours 522, and 12 hours 724.

As evident from the plots, the intensities of the crystalline peaks that correspond to quartz phase for the sand were observed to reduce with the ball milling time. There is a periodical decrease for the peak intensities with milling time that is correlated to the decrease in particle (crystallite) size of the nanosand.

In the Example, PAM-coated nanosand was prepared. Again, the term PAM-coated nanosand in this disclosure including the Example means PAM-hydrogel-coated nanosand. As also mentioned, FIG. 2 generally gives a schematic illustration of the process of preparation of PAM-coated nanosand in the Example.

Multiple samples of PAM-coated nanosand were prepared having different respective weight ratios of the PAM to nanosand over the range of 0.1 to 1. For each PAM solution, the PAM solution was well-mixed with nanosand and subsequently cured. Each PAM solution was prepared by adding 200 milligrams (mg) of low molecular weight PAM to 5 milliliters (ml) of distilled water to give the PAM at 4 wt % in the water, and left to stir for 1 hour. After that, the organic crosslinkers HQ and HMT (0.3 wt % each in the solution) and KCl (2 wt % in the solution) were added and the solution left to stir for another 15 minutes. This solution is considered as PAM solution. The nanosand and PAM solution mixture was then flushed with nitrogen gas for about 30 seconds and then cured at 150° C. for 48 hours. For comparison, neat-PAM hydrogel was prepared in the same fashion without nanosand and used as a reference.

Figure 8:
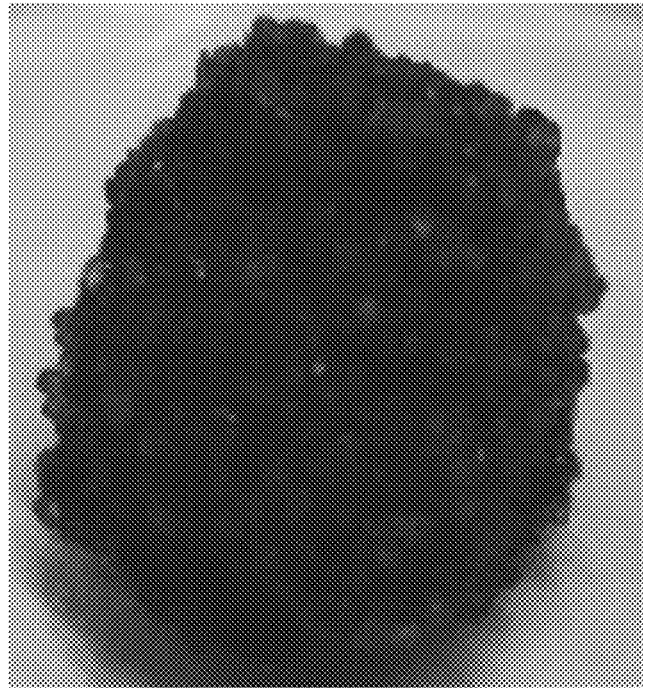
FIG. 8 is a photograph of PAM-coated nanosand in the Example as dried.

FIG. 8 is a photograph of the PAM-coated nanosand as dried (or nearly completely dried). The PAM-coated nanosand had no water (or almost no water). The PAM-coated nanosand has a weight ratio of PAM to nanosand of 1.

Figure 9:
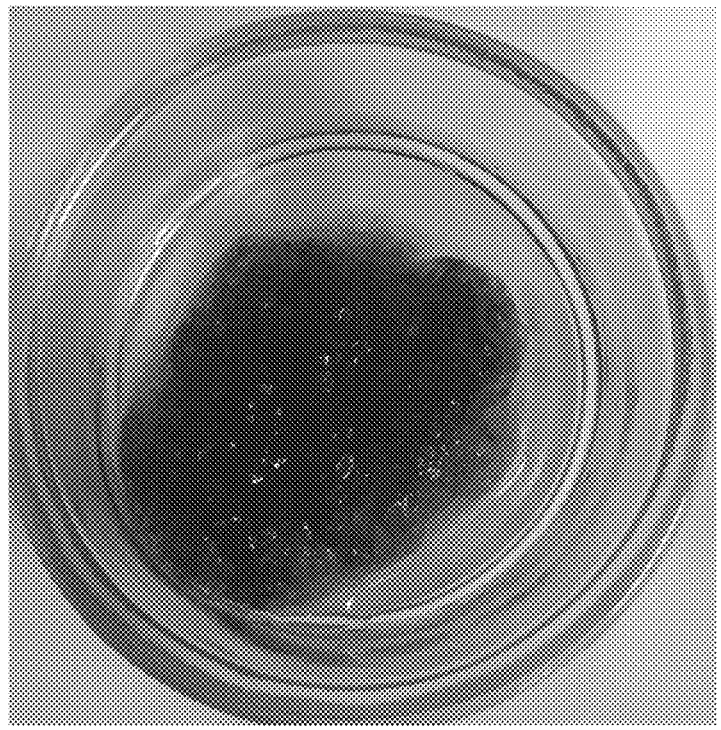
FIG. 9 is a photograph of PAM-coated nanosand of the Example in additional water beyond the amount of water of the PAM-coated nanosand as prepared.

FIG. 9 is a photograph of the PAM-coated nanosand in additional water beyond the amount of water of the PAM-coated nanosand as prepared. The PAM-coated nanosand has a weight ratio of PAM to nanosand of 1. In the photograph, the PAM hydrogel is swollen in the additional water. As discussed with respect to FIG. 11, the PAM hydrogel may increase in weight due to the incorporation of more water. Such may be characterized as swelling or further hydration. The size (volume) or diameter of the PAM hydrogel around the nanosand particles may increase.

Figure 10:
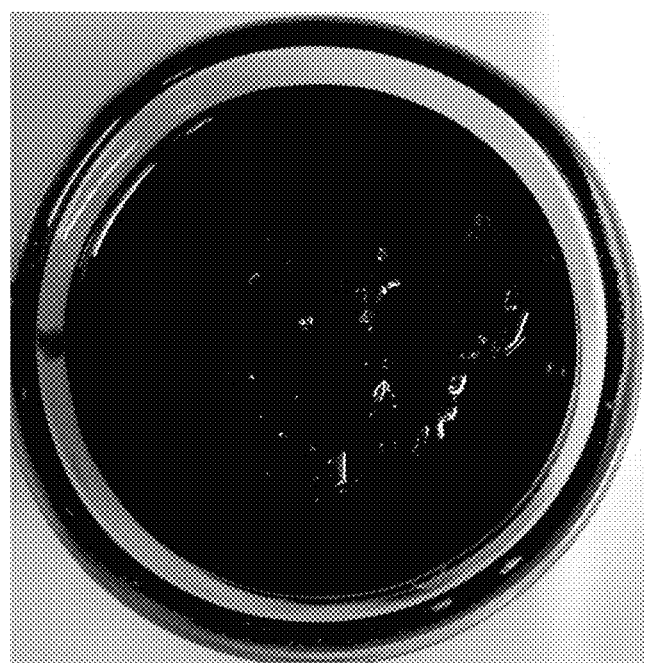
FIG. 10 is a photograph of PAM-coated nanosand of the Example in crude oil.

FIG. 10 is a photograph of the PAM-coated nanosand (having a weight ratio of PAM to nanosand of 1) in crude oil and in which the PAM hydrogel shrunk as the PAM hydrogel disintegrates into pieces in the oil. Such may be characterized as dehydration. The size (volume) or diameter of the PAM hydrogel around the nanosand particles may decrease. In some implementations, the PAM hydrogel or portions of the PAM hydrogel may become dehydrated with little or no water, and with the PAM and nanosand remaining.

Figure 11:
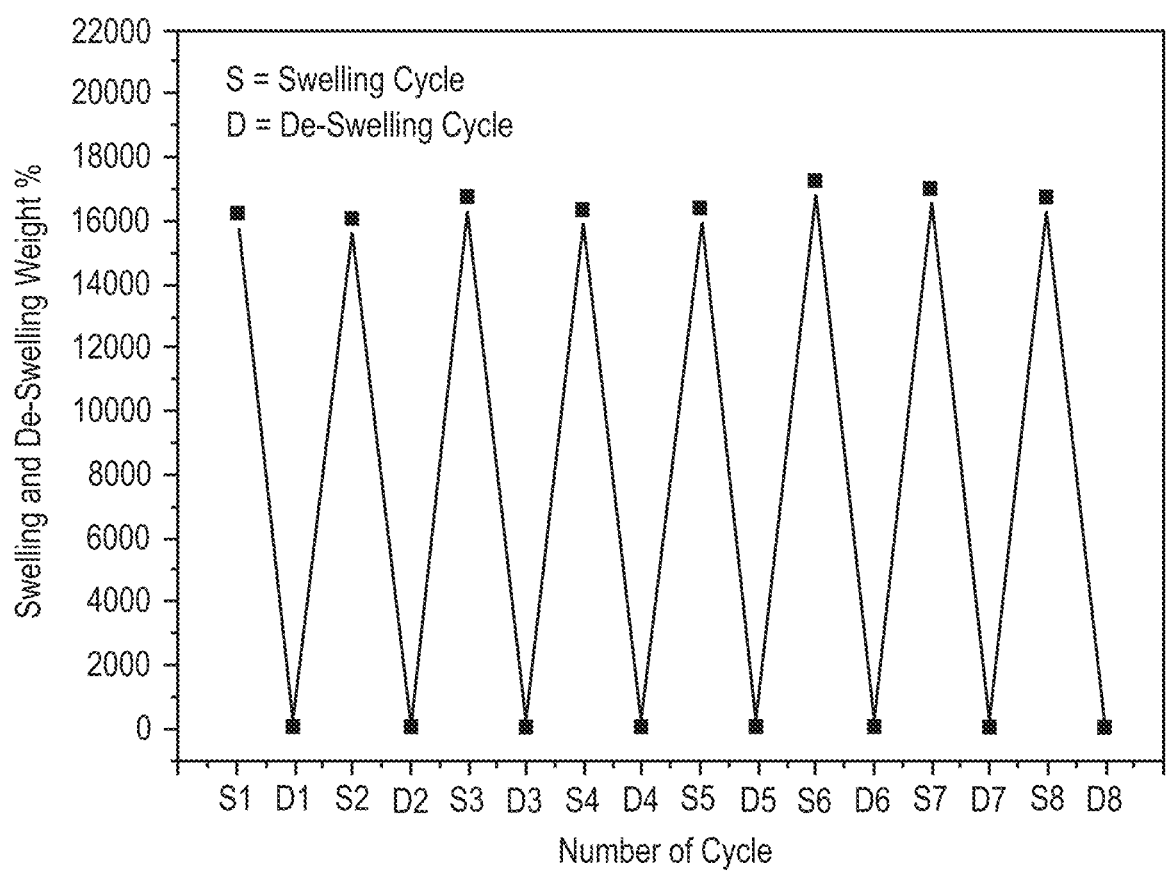
FIG. 11 is a plot of change in weight of PAM-coated nanosand of the Example versus cycles of swelling and de-swelling.

FIG. 11 is a plot of change in weight (in %) of the PAM-coated nanosand versus cycles of swelling (S1-S8) and de-swelling (D1-D8) of the PAM-coated nanosand. In particular, the weight change is generally for the PAM hydrogel versus cycles of swelling and de-swelling of the PAM hydrogel. [The 0% represents a state characterized as full de-swelled. The 16,000% represents a state characterized as fully swelled. The cycling study carried out on table-top laboratory conditions show the potential of the prepared material. The magnitude of swelling and de-swelling cycles for the PAM-coated nanosand hydrogel over the eight consecutive cycles remain consistent and altered only marginal or negligible. The PAM hydrogel layer absorbs a substantial amount of water (an increase of 16,000%) and swelled so that the PAM hydrogel layer may block (e.g., completely blocks) water channels in the subterranean formation. In contrast, at the oil zone, the hydrogel of the PAM-coated nanosand is de-swelled (e.g., completely de-swelled) and intact (or disintegrated into pieces and permeate oil). Hence, the oil permeation (permeability of the subterranean formation in the oil zone) is little affected or unaffected.

Figure 12:
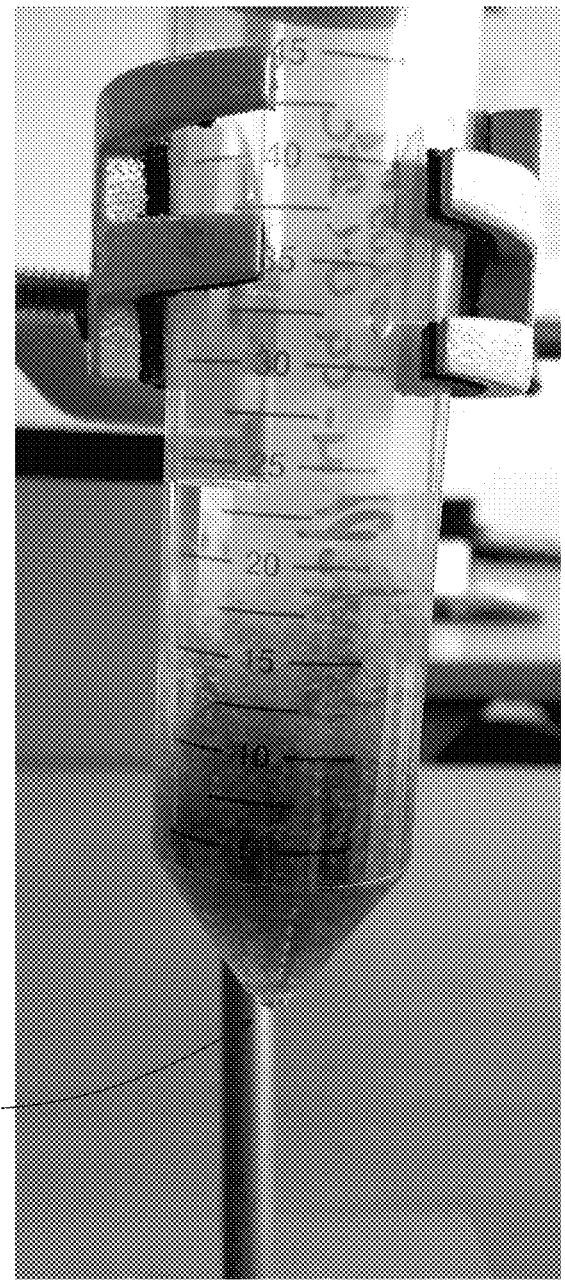
FIG. 12 is a photograph of the PAM-coated nanosand as prepared in the Example and placed in a laboratory tube.

FIG. 12 is the PAM-coated nanosand as prepared and placed in a laboratory tube. The tube has an opening (hole) at the bottom of the tube. No water dripped from the tube through the opening due to gravity. The sample of PAM-coated nanosand place in the tube has a weight ratio of PAM to nanosand of 1.

Figure 13:
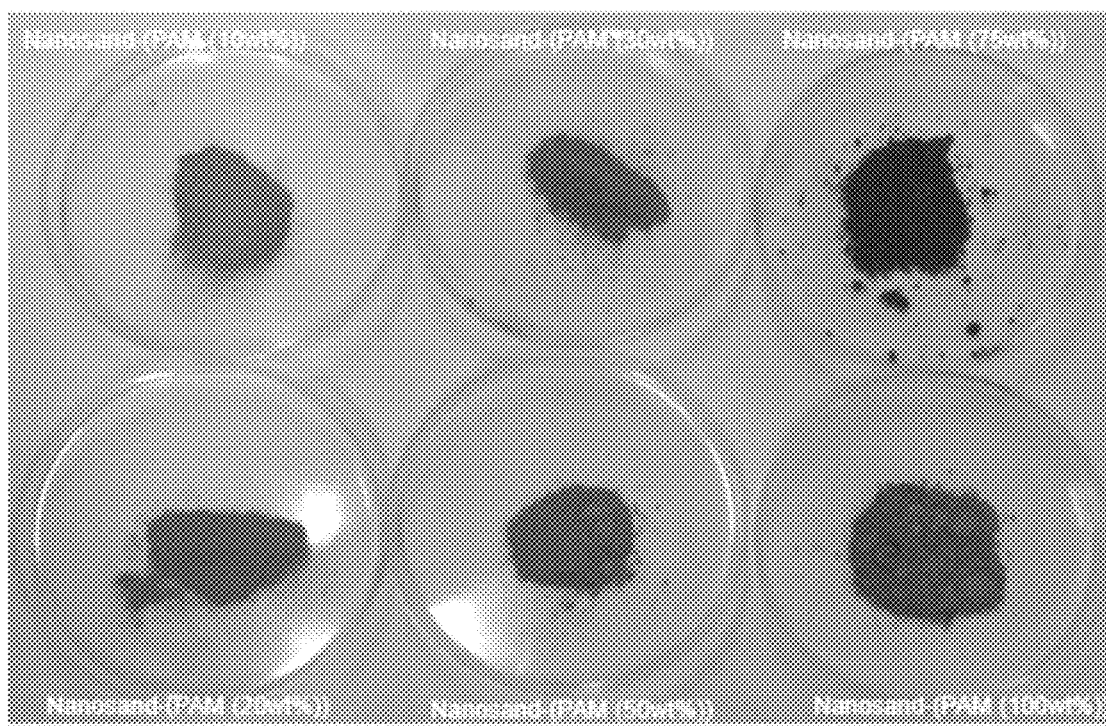
FIG. 13 is photographs of dried samples of PAM-coated nanosand formed in the Example.

FIG. 13 is photographs of dried samples of PAM-coated nanosand formed in the Example. The samples are nanosand and PAM without liquid or significant liquid. Each sample has a different weight ratio of PAM to nanosand, as indicated. For instance, the depicted 100 wt % means for the PAM-nanosand structures in that sample, the weight ratio of PAM to nanosand is 1. The depicted 10 wt % means for the nanosand-PAM core-shell structures in that sample, the weight ratio of PAM to nanosand is 0.1. The color of the samples gradually changed as a function of the increasing PAM. The 10 wt % sample was an orange sandy color. The 50 wt % sample was a brown color. The 100 wt % was a dark grey color. The change in color for the samples over increasing PAM concentration indicates successful coating of PAM shell to the nanosand in the preparation of the PAM-coated nanosand at the increased PAM concentrations.

Figure 14:
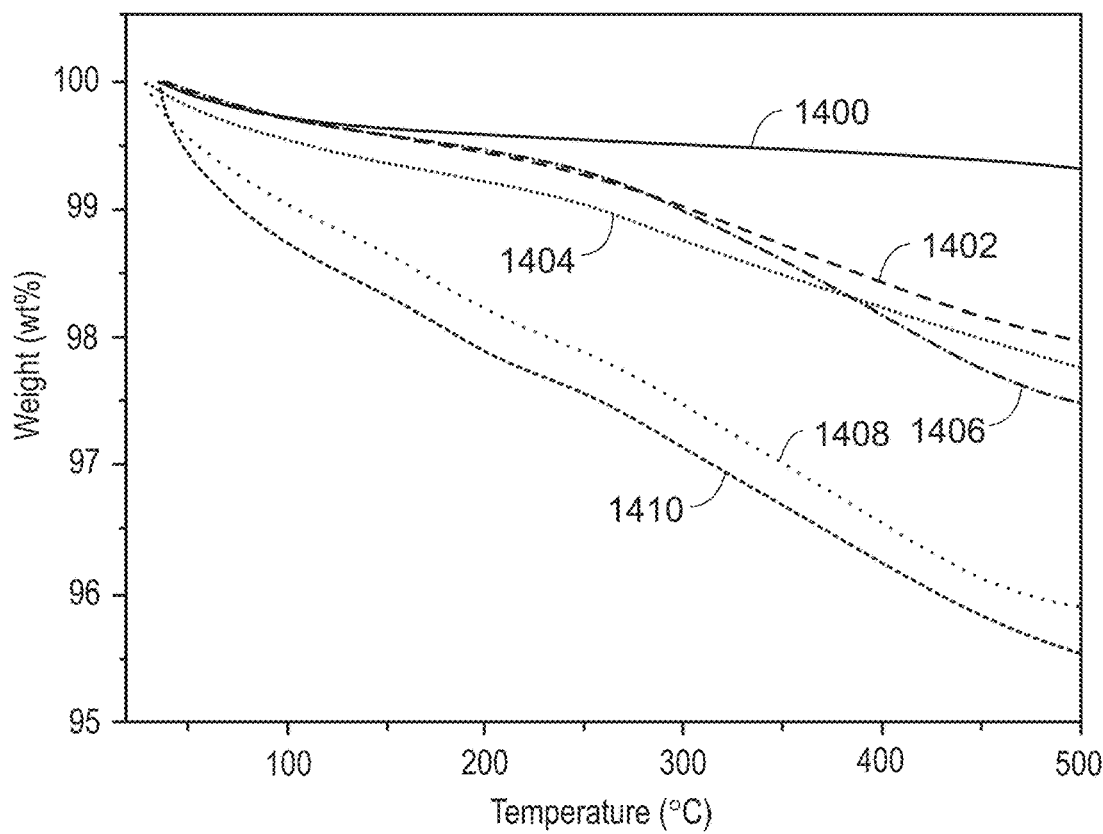
FIG. 14 is a plot of thermogravimetric analysis (TGA) thermograms of the PAM-coated nanosand of varied weight ratios of PAM to nanosand prepared in the Example.

FIG. 14 is a plot of TGA thermograms of the PAM-coated nanosand of varied weight ratios of PAM to nanosand prepared in the Example. The y-axis is weight percent of the sample with 100 wt % being the sample prior to any weight loss. The x-axis is temperature (° C.).

All of the thermogravimetric analysis (TGA) thermograms depicted are for the PAM-coated nanosand. Thermogravimetric analysis is also known as thermal gravimetric analysis. The TGA thermogram 1400 is for a weight ratio of PAM to NS equal to about 0.1. The TGA thermogram 1402 is for a weight ratio of PAM to NS equal to about 0.2. The TGA thermogram 1404 is for a weight ratio of PAM to NS equal to about 0.3. The TGA thermogram 1406 is for a weight ratio of PAM to NS equal to about 0.5. The TGA thermogram 1408 is for a weight ratio of PAM to NS equal to about 0.75. The TGA thermogram 1410 is for a weight ratio of PAM to NS equal to about 1.

The TGA thermograms in FIG. 14 indicate resistance to temperature degradation of the PAM-coated nanosand. The thermal stability of the coated nanosand exceeds 150° C.

A number of implementations have been described. Nevertheless, it will be understood that various modifications may be made without departing from the spirit and scope of the disclosure.

What is claimed is:

1. A method of treating a wellbore formed in a subterranean formation, comprising:
   applying polyacrylamide (PAM)-coated nanosand as a relative permeability modifier (RPM) to the wellbore, wherein the PAM-coated nanosand comprises nanosand coated with PAM hydrogel, and wherein the PAM hydrogel comprises crosslinked PAM in water; and
   reducing water production from the subterranean formation into the wellbore by applying the PAM-coated nanosand to the wellbore.

2. The method of claim 1, wherein applying the PAM-coated nanosand comprises pumping the PAM-coated nanosand into the wellbore from an Earth surface, and wherein the PAM-coated nanosand is PAM-hydrogel-coated nanosand.

3. The method of claim 1, wherein the applying the PAM-coated nanosand comprises flowing the PAM-coated nanosand through the wellbore into the subterranean formation, and wherein the PAM-coated nanosand is a relative permeability modifier (RPM).

4. The method of claim 1, wherein the applying the PAM-coated nanosand comprises treating the wellbore for excess water production.

5. The method of claim 1, comprising reducing permeability of a water zone of the subterranean formation by applying the PAM-coated nanosand, wherein applying the PAM-coated nanosand comprises flowing the PAM-coated nanosand through the wellbore into the water zone.

6. The method of claim 1, wherein the PAM hydrogel of the PAM-coated nanosand expands in a water zone of the subterranean formation.

7. The method of claim 1, wherein applying the PAM-coated nanosand comprises a bullhead injection of the PAM-coated nanosand.

8. The method of claim 1, wherein applying the PAM-coated nanosand comprises flowing the PAM-coated nanosand through the wellbore into an oil zone of the subterranean formation and into a water zone of the subterranean formation, wherein the PAM-coated nanosand reduces permeability of the water zone more than reduces permeability of the oil zone.

9. The method of claim 8, wherein the PAM-coated nanosand does not reduce the permeability of the oil zone.

10. The method of claim 1, wherein the PAM hydrogel of the PAM-coated nanosand contracts in an oil zone of the subterranean formation.

* * * * *